United States Patent
Waldmann

(10) Patent No.: US 12,253,067 B2
(45) Date of Patent: Mar. 18, 2025

(54) ACTUATOR DEVICE HAVING POWER SPRING RETENTION

(71) Applicant: Siemens Industry, Inc., Alpharetta, GA (US)

(72) Inventor: Samuel Waldmann, Barrington, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 72 days.

(21) Appl. No.: 18/190,558

(22) Filed: Mar. 27, 2023

(65) Prior Publication Data

US 2024/0328396 A1 Oct. 3, 2024

(51) Int. Cl.
*F03G 1/02* (2006.01)
*F24F 13/14* (2006.01)

(52) U.S. Cl.
CPC .......... *F03G 1/022* (2021.08); *F24F 13/1426* (2013.01); *F24F 2013/146* (2013.01)

(58) Field of Classification Search
CPC ....... F03G 1/022; F03G 1/08; F24F 2013/146
See application file for complete search history.

(56) References Cited

U.S. PATENT DOCUMENTS

| | | | | |
|---|---|---|---|---|
| 1,489,808 A | * | 4/1924 | Asbury | F03G 1/08 185/43 |
| 4,478,313 A | * | 10/1984 | Wakase | F03G 1/08 267/156 |
| 4,576,252 A | * | 3/1986 | Omata | F03G 1/06 188/290 |
| 7,036,800 B2 | * | 5/2006 | Ellis | F24F 13/15 239/57 |
| 10,989,176 B2 | * | 4/2021 | Utata | F03G 1/08 |
| 2021/0032912 A1 | | 2/2021 | Inan et al. | |

FOREIGN PATENT DOCUMENTS

| | | | |
|---|---|---|---|
| EP | 0320407 A1 | | 6/1989 |
| EP | 0895885 A2 | * | 2/1999 |
| KR | 870003304 A | * | 4/1987 |

* cited by examiner

*Primary Examiner* — Phillip A Johnson

(57) ABSTRACT

There is described an actuator device comprising a single molded housing, a linear bridge feature, a spring hook retention feature, and a power spring. The single molded housing is formed by integrating the linear bridge feature across the single molded housing and the spring hook retention feature to one side of the linear bridge feature. The power spring is inserted laterally through the linear bridge feature of the actuator device. The power spring includes a spring hook at one end, and the spring hook of the power spring attaches to the spring hook retention feature of the actuator device. The power spring applies, at least in part, a torque to a control shaft coupled to the actuator device.

20 Claims, 4 Drawing Sheets

ACTUATOR DEVICE HAVING POWER SPRING RETENTION

FIELD OF THE INVENTION

This application relates to the field of fire protection systems and, more particularly, to actuator devices for fire and smoke dampers of fire protection systems.

BACKGROUND

Dampers are components of a Heating Ventilation Air Conditioning ("HVAC") System. The dampers hinder heat, fire, and smoke from spreading throughout a facility by preventing them from circulating through the air ducts and vents. When a fire emergency is detected, the damper closes and cuts off air distribution to various areas of the facility, thereby minimizing the amount of oxygen feeding the fire and smoke travelling to other areas where occupants may be located.

Fire dampers and smoke dampers include actuator devices to control the open and close positions of the dampers. Power springs are used to mechanically drive rotary actuator devices to a fail-safe position in the event of an interruption to supply power. Typically, these springs are held in place with separate components, such as a cage and/or cover, to constrain the spring in position during operation. The additional components and materials needed to constrain the spring, as well as the labor required to assemble them, add significant cost to the damper actuator device.

SUMMARY

In accordance with one embodiment of the disclosure, there is provided an approach for retention of a power spring in an actuator device. The approach eliminates the need for additional parts in an actuator device to maintain a mechanical return spring in the actuator device. For conventional devices, the additional for spring retention add to the overall cost and assembly time of the actuator device. Thus, the approach provides cost and efficiency advantages, specifically the reduction of parts, material cost, inventory costs, and general maintenance costs. Also, the overall assembly time will be reduced as assembly of a constraining cover piece is not needed.

One aspect is an actuator device comprising a single molded housing, a linear bridge feature, a spring hook retention feature, and a power spring. The linear bridge feature is integrated across the single molded housing. The spring hook retention feature is integrated to one side of the linear bridge feature. The power spring is inserted laterally through the linear bridge feature of the actuator device. The power spring includes a spring hook at one end, and the spring hook of the power spring attaches to the spring hook retention feature of the actuator device. The power spring applies, at least in part, a torque to a control shaft coupled to the actuator device.

Another aspect is a method for assembling an actuator device. A single molded housing for the actuator device is formed. The actuator device includes a linear bridge feature integrated across the single molded housing and a spring hook retention feature integrated to one side of the linear bridge feature. A power spring is inserted laterally through the linear bridge feature of the actuator device in which the power spring includes a spring hook at one end. The spring hook of the power spring attaches to the spring hook retention feature of the actuator device. A torque is applied to a control shaft coupled to the actuator device in which the torque being applied at least in part by the power spring.

The above-described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
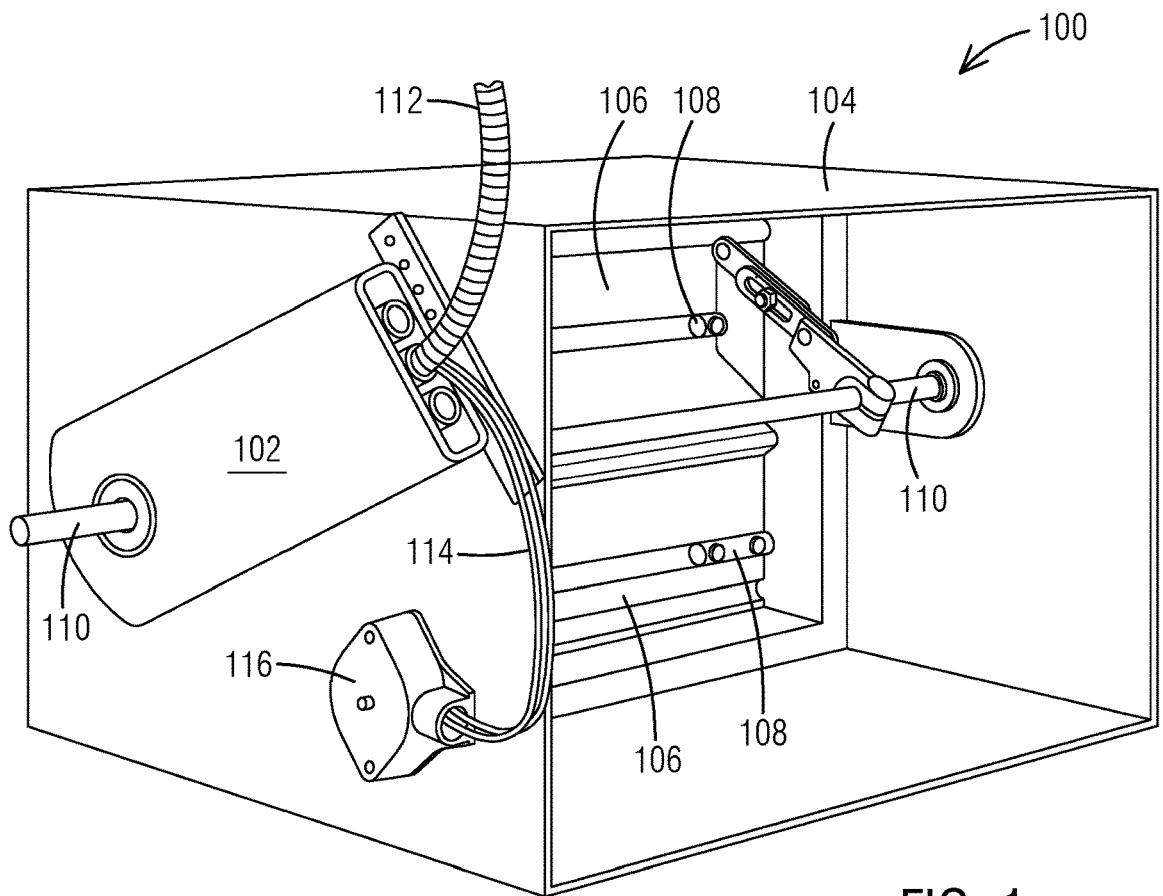
FIG. 1 is an illustration of a fire and/or smoke damper, including an actuator device, in an example implementation that is operable to employ techniques described herein.

Various technologies that pertain to systems and methods that facilitate assembly of a power spring in an actuator device will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

There is described an actuator device for an HVAC damper having a power spring retention for a power spring and a method for assembling the actuator device. The actuator device includes a housing having molded features so that a power spring may be maintained in a single component. The molded features allow the power spring to be inserted laterally from the side, in contrast to conventional devices in which the spring is dropped vertically from the top or bottom. Without the need for multiple retention components, implementation of the molded features of the device minimizes the number of components and associated assembly time, thus saving labor and material costs.

Referring to FIG. 1, there is shown an illustration of a fire and/or smoke damper 100, including an actuator device 102, in an example implementation that is operable to employ techniques described herein. The damper 100 includes a frame 104 and multiple adjustable blocking members 106 such as vanes, blades, fins, louvers or the like. The blocking members 106 are connected to rotatable shafts 108, which in turn are connected to a control shaft 110. The control shaft 110 connects to the actuator device 102 and mechanically couples to the rotatable shafts 108. Rotation of the control shaft 110 results in rotations of the rotatable shafts 108 and their corresponding blocking members 106.

As the blocking members 106 rotate, they either open the damper 100 to allow air to flow of therethrough or close the damper to block the flow of air therethrough. In some situations, the blocking members 106 may also be oriented in positions intermediate the fully open and fully closed positions, thus only partially restricting the flow of air through the damper. During a fire emergency, the actuator device 102 operates the blocking members 106 to close, or remain closed, in order to hinder the ability of heat, fire, and smoke to spread throughout a facility.

The actuator device 102 is operable to control the damper 100 by rotating the blocking members 106 of the damper. The actuator device 102 is shown physically attached to the damper 100 in FIG. 1. For some embodiments, the actuator device 102 may be coupled to other wires 114 in order to connect to additional devices, such as an electronic fusible link (EFL) 116 or sensor.

Figure 2:
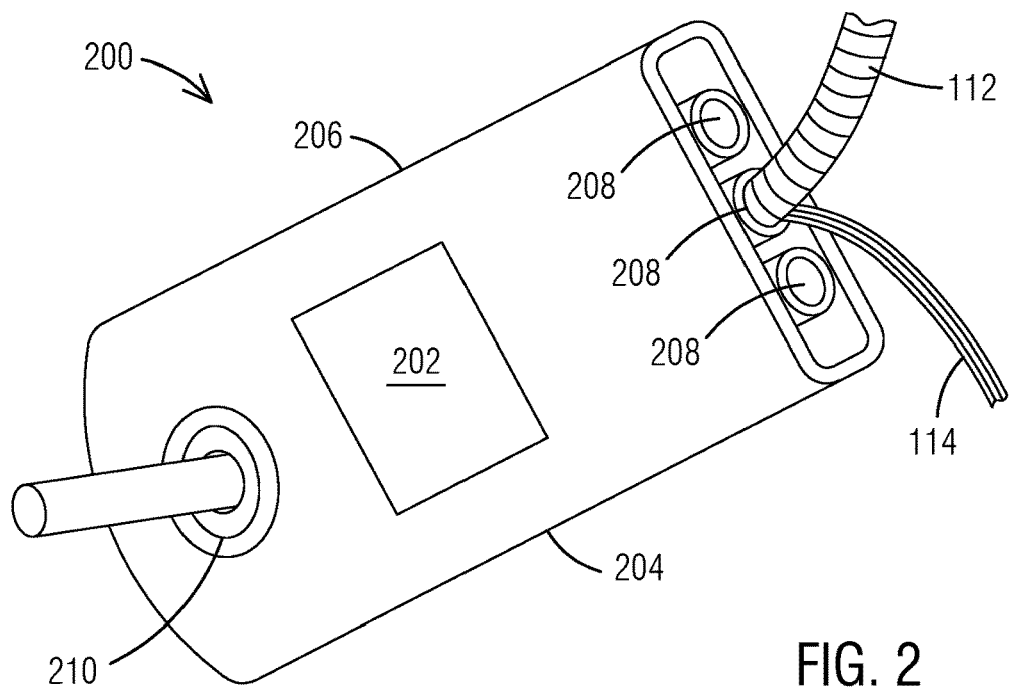
FIG. 2 depicts an example implementation of the actuator device of FIG. 1.

Referring to FIG. 2, there is shown a close-up view of an example implementation of an actuator device 200, corresponding to the actuator device 102 of FIG. 1. The actuator device 102 generally includes an electrical circuit 202 to control positions of the damper 100 as well as other components, such as a power supply circuitry, a motor controller, a driving member in the form of a motor, and a motor/damper interface. The actuator device 102 also includes lower and upper housing 204, 206 to protect and otherwise support the electrical circuit 202 and its associated component, as well as maintain the actuator device in proximity to the damper 100. For some embodiments, the lower housing 204 including one or more troughs integrated therein may be constructed of a die-cast metallic material, such as aluminum. For some embodiments, the upper housing 206 including the one or more protuberances integrated therein may be constructed of a moldable polymeric material, such as plastic. The actuator device 102 further includes one or more conduits 208 for receiving the cables 112 coupled to the actuator device for power and/or control as well as a shaft support 210 for receiving and controller the control shaft 110.

Each cable 112 coupled to the electrical circuit 202, so each cable provides power and control to the electrical circuit. Each cable may be an individual cable or multiple, distinct cables. For example, for some embodiments, each cable 112 may include a first cable providing power to the electrical circuit and a second cable providing control information to the electrical circuit.

Figure 3A:
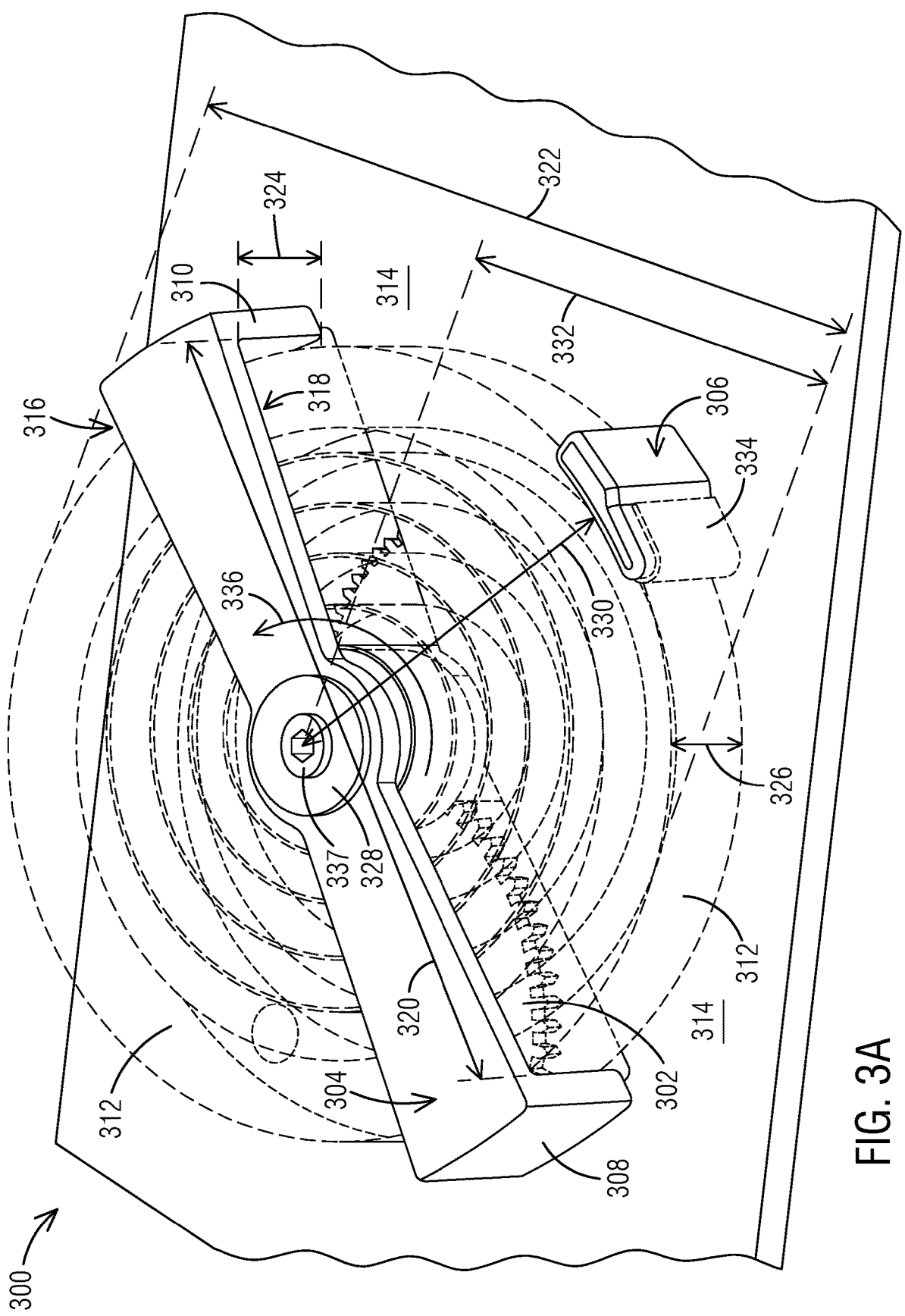
FIGS. 3A and 3B are simplified, close-up views of a single molded housing for a power spring mechanism of the actuator device of FIG. 1.
Figure 3B:
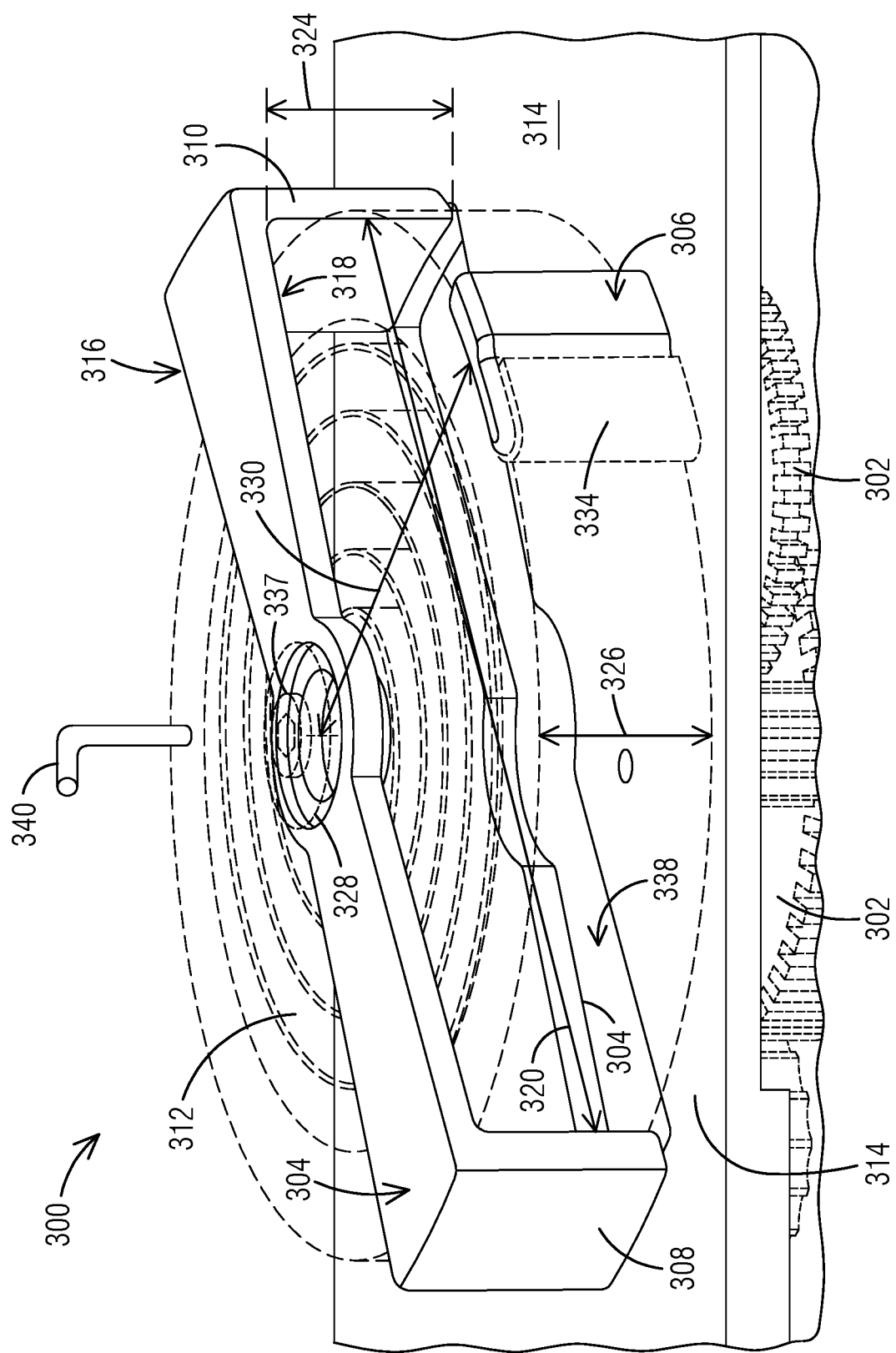

Referring to FIGS. 3A and 3B, there are shown simplified, close-up views of a single molded housing 300 for a power spring mechanism of the actuator device. The single molded housing 300 of the actuator device is a rotary actuator device including a chassis plate or frame for gear train components 302 of the actuator device. The gear train components 302 are effective to drive or otherwise control the control shaft 110 of the damper in conjunction with the power spring. Examples of the gear train components include, but are not limited to, the electrical circuit 202, power supply circuitry, motor controller, driving member, and a motor/damper interface as represented for FIG. 2. The features 304, 306 are molded or integrated in the single molded housing 300 to maintain the power spring, thus requiring no other supplemental components.

In addition to the single molded housing 300, the actuator device comprises a linear bridge feature 304. The linear bridge feature 304 is integrated across the single molded housing 300. The linear bridge feature 304 includes a first bridge end 308 and a second bridge end 310 supporting a power spring 312 radially, and the linear bridge feature 304 extends between the first and second bridge ends 308, 310 supporting the power spring 312 axially. Each of the first and second bridge ends 308, 310 connects the linear bridge feature 304 to a base surface 314 of the single molded housing 300. Accordingly, the linear bridge feature 304 is located offset from the base surface 314 by the first and second bridge ends 308, 310. For some embodiments, the offset distance is equivalent or similar to a dimension of the first and/or second bridge ends 308, 310.

The linear bridge feature 304 includes a first open side 316 and a second open side 318. The first open side 316 of the single molded housing 300 has an inner length 320 greater than or equal to an outer diameter 322 of the power spring 312 and an inner depth 324 greater than or equal to an outer height 326 of the power spring 312. In addition, the second open side 318 is bounded by a spring hook retention feature 306. In this respect, the spring hook retention feature 306 maintains and supports the power spring radially, in conjunction with the first and second bridge ends 308, 310. The linear bridge feature 304 has first and second bridge ends 308, 310 and a midpoint region ("midpoint") 328 located between the first and second bridge ends 308, 310. The first bridge end 308, the second bridge end 310, and the spring hook retention feature 306 are located substantially equidistant from the midpoint 328. For some embodiments, the linear bridge feature 304 has a bow-tie shape that tapers near the midpoint 328 of the linear bridge feature 304.

As stated above, the actuator device includes the spring hook retention feature 306. The spring hook retention feature 306 is integrated to one side of the linear bridge feature 304. The spring hook retention feature 306 is located a distance 330 from the linear bridge feature 304 associated with a radius 332 of the power spring 312. The power spring 312 includes a spring hook 334 at one end, which is driven the spring hook retention feature 306 in a rotational direction 336. A tool 340 is coupled to a tool receptor 337 at a midpoint 328 of the linear bridge feature, and the tool 340 is operated to rotate the spring hook toward the spring hook retention feature.

The power spring 312 may be inserted laterally through the linear bridge feature 304 of the actuator device 110, 200, e.g., sliding in place from the side. The power spring 312 has a spiral form and the spring hook 334 is located at an outer periphery of the spiral form. The power spring 312 includes the spring hook 334 at one end, and the spring hook 334 attaches to the spring hook retention feature 306 of the actuator device. For some embodiments, the spring hook 334 mates to a die cast feature of the single molded housing 300. The power spring 312 stays in place because the spring requires "pre-wind" so that the actuator device has non-zero torque capabilities when the actuator device is on the home position (un-powered). This pre-wind fixes the spring hook to the die cast part so the power spring 312 is retained radially. The molded "bow tie" shape of the linear bridge feature 304 allows the power spring 312 to be constrained axially from an opposing side. Being molded or die cast, the single molded housing may include an open outline 338 corresponding to the shape of the linear bridge feature 304 to facilitate formation of the single molded housing 300 for the actuator device. The power spring 312 applies, at least in part, a torque to a control shaft 110 coupled to the actuator device 102, 200 (shown in FIGS. 1 and 2).

Figure 4:
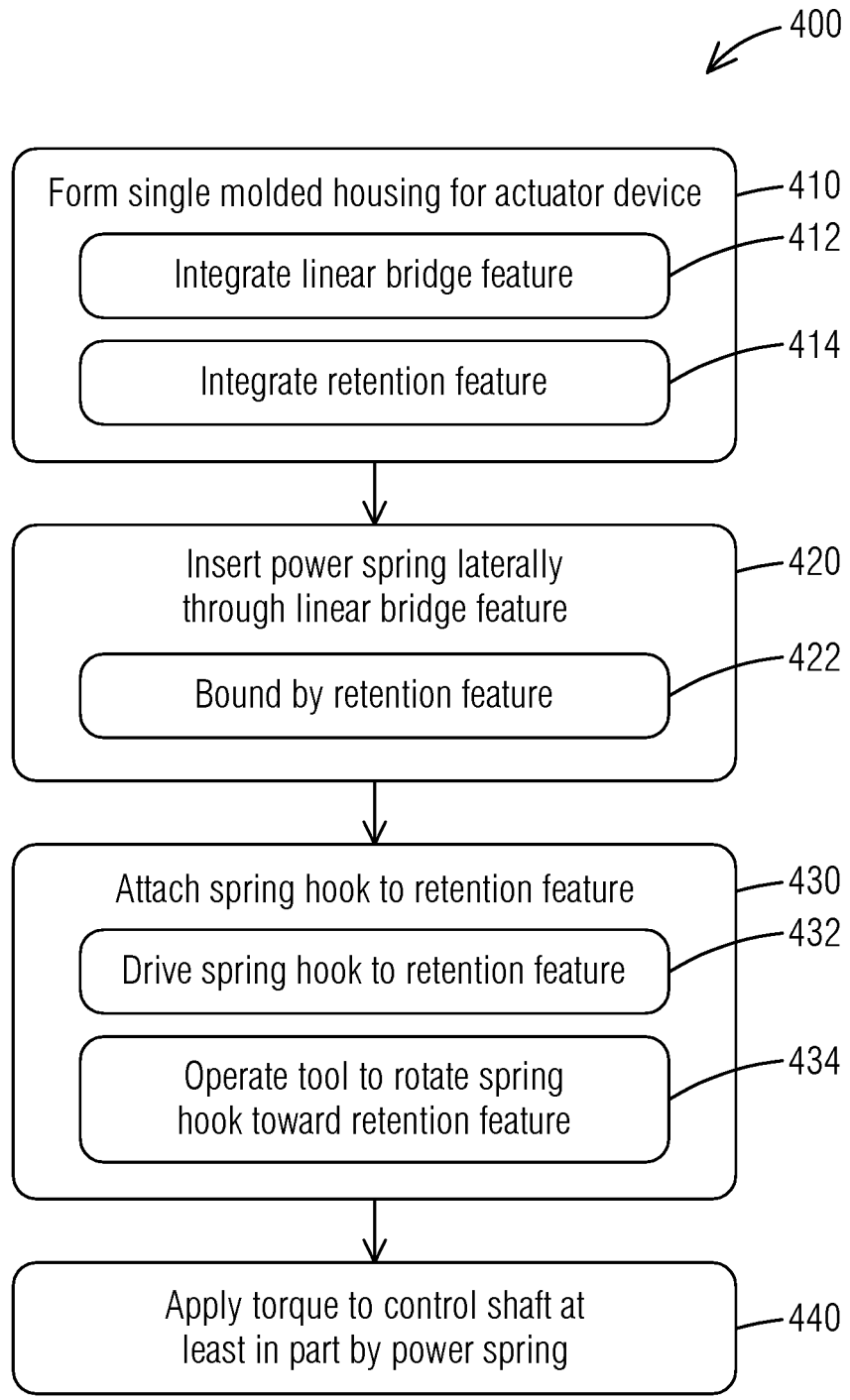
FIG. 4 is a flow diagram of an assembly operation in an example implementation that is operable to employ the techniques described herein.

Referring to FIG. 4, there is shown a flow diagram of an assembly operation 400 in an example implementation that is operable to employ the techniques described herein. A single molded housing 300 for the actuator device is formed (410) before or at an early state of the assembly operation 400. In particular, the actuator device includes a linear bridge feature 304 integrated (412) across the single molded housing 300 and a spring hook retention feature 306 integrated (414) to one side of the linear bridge feature 300.

Subsequent to forming (410) the single molded housing 300, a power spring 312 is inserted (420) laterally through the linear bridge feature 304 of the actuator device. The power sprint may be inserted in response to forming the single molded housing 300 during manufacture or subsequent to forming the housing during installation or maintenance. The power spring 312 includes a spring hook 334 at one end. Also, the linear bridge feature 304 includes first and second open sides 316, 318. The second open side 318 is bounded (422) by the spring hook retention feature 306. For some embodiments, the first open side 316 of the single molded housing 300 has an inner length 320 greater than or equal to an outer diameter 322 of the power spring 312 and an inner depth 324 greater than or equal to an outer height 326 of the power spring 312.

Subsequent to inserting (420) the power spring 312 through the linear bridge feature 304, the spring hook 334 of the power spring 312 is attached (430) to the spring hook retention feature 306 of the actuator device. For example, the spring hook 334 may attached (430) to the spring hook retention feature 306 in response to inserting (420) the power spring 312. During the process of attaching the spring hook 334 to the spring hook retention feature 306, the spring hook 334 may be driven (432) to the spring hook retention feature 306 in a rotational direction. For some embodiments, the spring hook 334 may be driven (432) to the spring hook retention feature 306 by operating (434) a tool 340 coupled at a midpoint 328 of the linear bridge feature 304 to rotate the spring hook 334 toward the spring hook retention feature 306.

Subsequent to attaching (430) the power spring 312 to the spring hook retention feature 306, a torque is applied (440) to a control shaft 110 coupled to the actuator device 102, 200 in which the torque is applied at least in part by the power spring 312. For example, the power spring 312 and the gear train components 302 of the actuator device, separately or in combination. Also, for some embodiments, the torque may be applied (440) to the control shaft 110 in response to attaching the power spring 312 to the spring hook retention feature 306.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. An actuator device comprising:
a single molded housing;
a linear bridge feature integrated across the single molded housing;
a spring hook retention feature integrated to one side of the linear bridge feature; and
a power spring inserted laterally through the linear bridge feature of the actuator device, the power spring including a spring hook at one end, the spring hook of the power spring attaching to the spring hook retention feature of the actuator device,
wherein the power spring applies, at least in part, a torque to a control shaft coupled to the actuator device.

2. The actuator device as described in claim 1, wherein the power spring has a spiral form, and the spring hook is located at an outer periphery of the spiral form.

3. The actuator device as described in claim 1, wherein the linear bridge feature includes first and second bridge ends supporting the power spring radially and a linear bridge extending between the first and second bridge ends supporting the power spring axially.

4. The actuator device as described in claim 3, wherein each of the first and second bridge ends connects the linear bridge to a base surface of the single molded housing and the linear bridge is located offset from the base surface by the first and second bridge ends.

5. The actuator device as described in claim 1, wherein:
the linear bridge includes first and second open sides;
the first open side of the single molded housing has an inner length greater than or equal to an outer diameter of the power spring and an inner depth greater than or equal to an outer height of the power spring; and
the second open side is bounded by the spring hook retention feature.

6. The actuator device as described in claim 5, wherein the spring hook retention feature is located a distance from the linear bridge associated with a radius of the power spring.

7. The actuator device as described in claim 1, wherein the linear bridge has a bow-tie shape that tapers near a midpoint of the linear bridge.

8. The actuator device as described in claim 1, wherein:
the linear bridge feature has first and second bridge ends and a midpoint located between the first and second bridge ends; and the first bridge end, the second bridge end, and the spring hook retention feature being located substantially equidistant from the midpoint.

9. The actuator device as described in claim 1, wherein the spring hook is driven the spring hook retention feature in a rotational direction.

10. The actuator device as described in claim 9, wherein a tool is coupled at a midpoint of the linear bridge feature, and the tool is operated to rotate the spring hook toward the spring hook retention feature.

11. A method for assembling an actuator device, the method comprising:
forming a single molded housing for the actuator device, the actuator device including a linear bridge feature integrated across the single molded housing and a spring hook retention feature integrated to one side of the linear bridge feature;
inserting a power spring laterally through the linear bridge feature of the actuator device, the power spring including a spring hook at one end;
attaching the spring hook of the power spring to the spring hook retention feature of the actuator device; and
applying a torque to a control shaft coupled to the actuator device, the torque being applied at least in part by the power spring.

12. The method as described in claim 11, wherein the power spring has a spiral form, and the spring hook is located at an outer periphery of the spiral form.

13. The method as described in claim 11, wherein the linear bridge feature includes first and second bridge ends supporting the power spring radially and a linear bridge extending between the first and second bridge ends supporting the power spring axially.

14. The method as described in claim 13, wherein each of the first and second bridge ends connects the linear bridge to a base surface of the single molded housing and the linear bridge is located offset from the base surface by the first and second bridge ends.

15. The method as described in claim 11, wherein:
the linear bridge includes first and second open sides;
the first open side of the single molded housing has an inner length greater than or equal to an outer diameter of the power spring and an inner depth greater than or equal to an outer height of the power spring; and
the second open side is bounded by the spring hook retention feature.

16. The method as described in claim 15, wherein the spring hook retention feature is located a distance from the linear bridge associated with a radius of the power spring.

17. The method as described in claim 11, wherein the linear bridge has a bow-tie shape that tapers near a midpoint of the linear bridge.

18. The method as described in claim 11, wherein:
the linear bridge feature has first and second bridge ends and a midpoint located between the first and second bridge ends; and
the first bridge end, the second bridge end, and the spring hook retention feature being located substantially equidistant from the midpoint.

19. The method as described in claim 11, wherein attaching the spring hook to the spring hook retention feature includes driving the spring hook to the spring hook retention feature in a rotational direction.

20. The method as described in claim 19, wherein driving the spring hook to the spring hook retention feature includes operating a tool coupled at a midpoint of the linear bridge feature to rotate the spring hook toward the spring hook retention feature.

* * * * *